United States Patent Office
3,614,816
Patented Oct. 26, 1971

3,614,816
METHOD OF MAKING CARTRIDGE CASES
Rolf Weyhmuller, Vaduz, Liechtenstein, Franz Xander, Gisingen, Austria, and Paul Greiner, Schaan, Liechtenstein, assignors to Werkzeugmaschinenfabrik Oerlikon-Buhrle AG., Zurich, Switzerland
Filed July 7, 1969, Ser. No. 839,366
Claims priority, application Austria, July 12, 1968, A 6,782/68; Switzerland, July 16, 1968, 10,805/68, 10,807/68
Int. Cl. B21k 21/04
U.S. Cl. 29—1.3                            6 Claims

ABSTRACT OF THE DISCLOSURE

Steel cartridge cases are made from round bar stock preferably containing 0.16 to 0.25% C, which is cut transversely into blanks. The blanks are upset cold so that the degree of upsetting $\phi_s = \log_e(F_1/F_0)$ is about $-0.5$, $F_1$ and $F_0$ being cross sectional areas at right angles to the direction of compression. Upsetting is followed by heat treatment for 1–5 minutes at temperatures well above $A_3$ with very rapid heating and cooling. A cup is formed by extrusion of the blank, and drawn to the required depth. The bottom is preformed during upsetting and finished after drawing, whereupon the neck is formed.

---

This invention relates to the manufacture of hollow receptacles of uniform size and shape, and particularly to a method of making steel cartridge cases.

Cartridge cases are commonly manufactured from steel blanks by plastic deformation without machining. The blanks were initially disc-shaped, and punched from plate material. Because of the scrap losses in the punching operation, it has been most recent practice to use metal rods or bars of circular cross section as the starting material, and to sever blanks from the elongated raw material by transverse cutting or shearing.

The blanks are prepared for the plastic shaping operation by heat treatment and surface treatment, are then first upset, thereafter extruded to produce a cup shape, and subjected to repeated drawing steps until the desired wall thickness and depth of the cup-shape is achieved. The bottom portion of the drawn blank is shaped in two additional steps, and ultimately the rim of the cup is formed into a neck of reduced diameter.

In the attached drawing,

FIGS. 1 to 6 sequentially illustrate a disc shaped blank, the several intermediate shapes assumed by the blank during fabrication, and the ultimate cartridge, all views being in side-elevational section;

FIGS. 7 to 12 correspondingly illustrate the steps in the conversion of a blank cut from a bar or rod to the finished cartridge according to the instant invention;

According to the invention, the bottom portion of the blank is shaped during the initial pressing and upsetting operations in such a manner that a single subsequent shaping operation under pressure is sufficient to impart to the cartridge bottom the desired precise configuration and mechanical strength.

Figure 1:
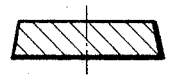
Figure 2:
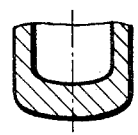
Figure 3:
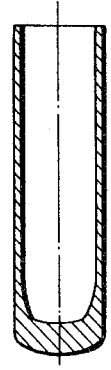
Figure 4:
Figure 5:
Figure 6:

When a blank is made from a disc shaped blank (FIG. 1), the bottom portion of the blank is subjected to a preliminary shaping operation (FIG. 4) so that an ultimate press operation at ambient temperature (FIG. 5) is sufficient to impart to the bottom of the cartridge both the desired shape as well as the necessary mechanical strength prior to the forming of the neck on the cartridge shell (FIG. 6). This sequence of operations is unavoidable with the use of disc-shaped round blanks which are first converted to a cup shape (FIG. 2) without being enclosed in a die, and are thereafter drawn to the desired depth and wall thickness (FIG. 3).

Figure 7:
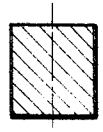
Figure 9:
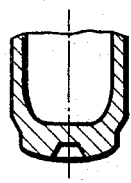
Figure 10:
Figure 11:

When cartridge cases are made from cylindrical rod or bar sections of an initial axial length greater than the diameter, as shown in FIG. 7, the cup shape is obtained by extrusion in a closed die (FIG. 9). It thereby becomes possible to give the bottom portion of the blank a suitable preliminary shape during or prior to extrusion, to maintain this shape during the subsequent drawing operations (FIG. 10), and to achieve the ultimate shape and necessary mechanical strength of the cartridge case bottom in a single cold pressing operation (FIG. 11). A separate preliminary shaping operation for the cartridge bottom (FIG. 4), inherently necessary in the conventional method may thus be avoided. The total number of operations may be reduced to fewer than were required heretofore for the manufacture of a cartridge case.

One of the factors determining the number of processing steps required for converting the blank to the finished cartridge is the work hardening of steels of relatively low carbon content, less than 0.3%, by cold work during shaping. The degree of working required in the manufacture of steel cartridge shells is so great that the deformability of the material reaches its limit after a few shaping steps so that several process annealing steps are normally unavoidable.

Figure 13:
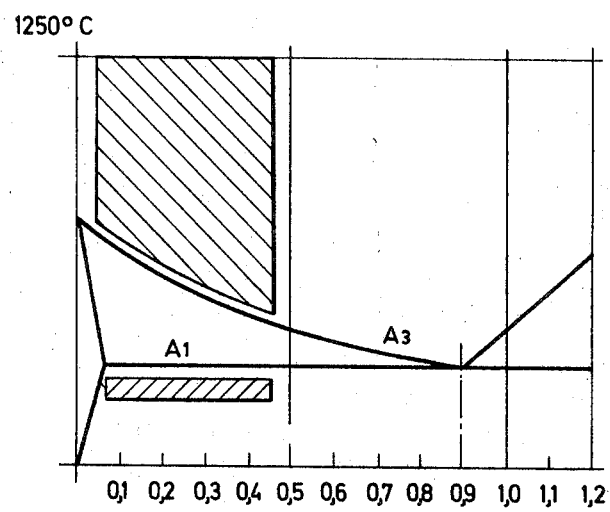
FIG. 13 shows as much of the iron-carbon phase diagram as will be needed for an understanding of this invention.

It has been customary to hold the partly shaped blanks below the line A–1 of the iron-carbon phase equilibrium diagram (FIG. 13), the line A–1 (normally 738° C.), the normal annealing temperature being indicated by a narrow, hatched rectangle. Recrystallization and grain refinement are achieved by holding the metal at the annealing temperature for relatively long periods and by choosing low cooling rates. Typically, a low carbon steel containing 0.15% and only the usual impurities has been held heretofore at a temperature of 620° C. to 680° C. for about 90 minutes or more, and has been cooled at a rate of 20 to 100° C. per hour, depending on the size and shape of the workpiece.

Because of the nature of the processes employed in shaping a cartridge case blank, the degree of deformation is not the same in the several parts of the workpiece, particularly at the transition from the thin axial wall to the heavy bottom wall, so that the degree of deformation may be in the critical range between 2 and 15%. The conventional heat treatment may therefore lead to the formation of extremely coarse grain which is distinguished by exceptionally high brittleness at low temperatures.

This harmful effect has been observed in cartridge cases manufactured under conditions in which areas of critical deformation cannot be avoided by the nature of the process employed, the areas of critical deformation being most readily recognized by the formation of a coarsely crystalline grain structure under conventional annealing conditions as indicated above. When a shell equipped with such a cartridge case is fired at extremely low temperatures of $-20°$ C. or lower, the cartridge case bottom may be torn off by the pressure of the gases generated during explosion or by the action of the extractor.

In order to avoid such defects, it has been the object to refine the grain structure in a conventional manner by full or true annealing beyond $A_3$ with subsequent quick cooling, or by heating above $A_3$ and quenching in water with subsequent conventional softening by annealing (Bardenheuer). The workpieces thereafter were subjected to further cold working in order to achieve the necessary mechanical strength by work hardening.

It has now been found that the formation of coarse grains does not only depend on a certain annealing temperature, but also requires a certain minimal annealing time. It has been found important that the partly worked blank be heated as quickly as possible through the critical range of temperatures, and that the treatment be conducted in such a manner that the deformability of the workpiece be restored fully while the undesired consequences of the conventional annealing treatment are avoided. According to the invention, this is achieved by raising the temperature of the workpiece from a starting temperature of about 300° C. to an ultimate temperature between the temperature of austenite conversion at $A_3$ in the iron-carbon phase diagram and 1250° C., held at such a temperature for about 1 to 5 minutes, and cooling it thereafter at a rate of about 50° to 100° C. per minute at least to the starting temperature. The annealing temperatures of the invention are in he large hatched area of FIG. 13 between the line $A_3$ and the temperature of 1250° C.

It has been found that the formation of coarse grains is fully avoided in carbon steels and in low alloy steels containing less than 0.3% carbon if the heating rate is high enough, the holding time at temperatures at least 50° C. above $A_3$ is short, and the cooling rate is high. Yet, the deformability is restored to its full extent. The preferred holding temperatures are high enough to produce overheating under conventional conditions of heat treatment.

For a typical carbon steel containing 0.15% carbon and free from significant amounts of alloying elements other than the usual impurities, the following annealing conditions have been found effective according to the invention:

Ultimate or holding temperature 950° to 1050° C.
Heating time from 300° C. to holding temperature—1–5 minutes
Time at holding temperature—1–5 minutes
Cooling rate to 500° C.—50° to 100° C. per minute The required rapid heating rate is preferably achieved by induction heating or in a directly fired oil or gas heated furnace. The rapid cooling rate is achieved in a rapidly flowing conventional protective atmosphere which is led over water or brine cooled heat exchangers.

The mechanical properties of the cartridge cases determine their operating characteristics in modern, quick-firing weapons. When cartridge cases were manufactured by traditional methods, steel having a low carbon content was employed, and the ultimate surface strength was achieved by hardening the material by cold working. However, the values of tensile strength achieved in this manner were limited to 50–70 kg./mm.$^2$. When higher strength values were required, a steel containing 0.27 to 0.37% carbon was used, and the cartridges having received their ultimate shape by pressing were hardened by heating and quenching.

While the low carbon steels have the desirable property of hardening when cold worked, the cartridges to be hardened by thermal treatment require additional press-forming steps which is a serious disadvantage. However, the strong work hardening tendency of the low carbon steels causes deformability to be a minimum when the shaping process is completed so that the materials has very little residual ductility.

It has now been found that high strength in the finished cartridge without ultimate hardening by heat treatment can be achieved by the use of steel having a carbon content of 0.16 to 0.25% and free from significant amounts of alloying elements other than the usual impurities. Such types of steel in the transition region between case hardening steel and heat-treatable steel are not commonly employed. It has been found that this metal has good work hardening characteristics and can be made into cartridge cases in fewer steps than carbon steels of lower carbon content. Because of the smaller deformation, the hollow shaped bodies have a greater residue of deformability, and the residual ductility of the metal in the finished cartridge is higher, thereby providing a wider margin of safety against the formation of cracks in the finished product.

The steel material for the method of the invention is obtained as a starting material in bars or rods. Any defects in the raw material become apparent as cracks in the finished product.

Longitudinal cracks in the raw material are practically unavoidable and are due to small areas of overlap, lamination produced during rolling, slag inclusion, banding on the surface or directly beneath the surface, and the like. It has been proposed to test materials for their cold workability by means of an upsetting test. A suitably dimensioned specimen is plastically deformed in axial compression until a portion of the surface, usually cylindrical, whose cross section is increased by the deformation, fails by cracking, and the "degree of upsetting" achieved at the first crack is considered a measure of the quality of the material.

It has now been found that a few blanks out of each batch develop cracks when subjected to upsetting of a precisely defined degree. The relationship between the appearance of cracks in a precisely controlled upsetting operation and the presence of defects in the surface of the blank has been investigated, and the investigation was particularly directed to the determination of surface defects in the finished product due to defects of the starting material if a certain degree of upsetting was used in the testing of the blanks. A good correlation was found between the appearance of cracks in the upsetting test and the presence of defects in the starting material, and it has been ascertained that residual defects in the finished product can be controlled to any desired magnitude by suitably upsetting the raw material blanks and visually sorting the upset blanks to remove those showing cracks.

Figure 14:
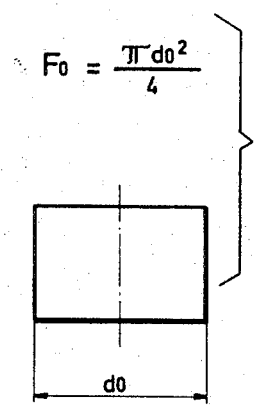
FIG. 14 shows a blank of the invention cut from a cylindrical rod in side-elevation.
Figure 15:
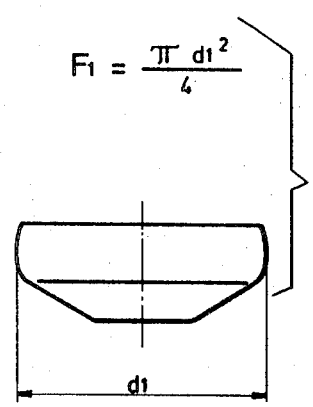
FIG. 15 illustrates the blank of FIG. 14 after a first shaping operation.

It has been found that the starting material is used most economically and unacceptable defects in the finished product are avoided if the blanks are upset to an initial "degree of upsetting," $\phi_s$, between limits of $-0.4$ and $-0.8$, and those upset blanks which show cracks are discarded. The degree of upsetting, $\phi_s$ is defined as $$\phi_s = \log_e (F_1/F_0)$$

wherein $F_0$ is the cross section of the blank prior to upsetting and $F_1$ is the cross section after upsetting, the workpiece being upset by compressive forces at right angles to the cross sections $F_0$, $F_1$ as shown in FIGS. 14 and 15. The maximum depth of surface cracks in the finished cartridge cases which are due to imperfections in the raw material has been found to be proportional to the diameter $d_1$ of the upset blanks which pass visual inspection if all other conditions are held constant. It is thus possible to determine in advance the magnitude of the deepest cracks which will be formed in the finished cartridge shells by selecting the proper initial upsetting conditions.

Figure 8:
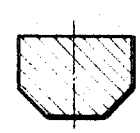

In one specific example, a bar or rod of 0.15% carbon steel had a diameter $d_0$ of 28 mm. and was cut transversely into blanks which were upset to the shape shown in FIGS. 8 and 15, and to a diameter $d_1$ of 36 mm. The ratio of $F_0:F_1 = d_0^2:d_1^2 = 1:1.65$, and the value of $\phi_s$ was $-0.5$. Upset blanks which showed visible cracks were discarded.

The upset blanks passing visual inspection were heated to 300° C., and thereafter within 3 minutes to 950° C., held at that temperature for three minutes, and cooled at a rate of 70° C. per minute to 500° C., whereupon they were air cooled to ambient temperature.

Figure 12:

The blanks were subjected to a conventional surface treatment (Bonderizing) prior to the subsequent cold extrusion step in which the bottom portion of the blank received its preliminary shape and a cup was formed (FIG. 9). The bottom shape was retained during the subsequent heat treatment and surface treatment prior to drawing of the axial wall of the blank to the desired thickness (FIG. 10). The bottom of the cartridge received its ultimate shape in a single cold pressing operation (FIG. 11) which was followed by shaping of the neck (FIG. 12).

The maximum depth of surface cracks found in the finished cartridge shells was 0.108 mm. The proportionality factor between the diameter of the upset blanks and the depth of the cracks in the finished product was therefore 0.003 and has been found to be characteristic for the steel employed and the degree of upset $\phi_s$ used in the operation which resulted in the blank shape seen in FIGS. 8 or 15. The proportionality factor is a constant for a given material and a selected degree of upsetting, and is therefore readily determined empirically.

What is claimed is:

1. A method of making steel cartridge cases which comprises:
    (a) transversely cutting blanks from an elongated steel bar or rod;
    (b) upsetting said blanks in a first shaping step to reduce the dimensions thereof in the direction of elongation of said bar or rod;
    (c) extruding the upset blanks in a second shaping step in said direction to form cups, each cup having a bottom portion and an axial wall portion extending in said direction;
    (d) giving a preliminary shape to said bottom portions of said blanks in one of said steps;
    (e) drawing said cup-shaped blanks in a third shaping step to decrease the thickness of said axial walls and to increase the dimension of the same in said direction, while maintaining said preliminary shape of said bottom portions from said one step through said third step;
    (f) pressing said bottom portions to give the same a final shape in a fourth shaping step; and
    (g) forming a neck on each axial wall in a fifth shaping step.

2. A method as set forth in claim 1, wherein said one step is said second step.

3. A method as set forth in claim 2, wherein said blanks are upset until the cross sectional area $F_0$ of the same prior to said upsetting at right angles to said direction is increased to $F_1$, $\log_e(F_1/F_0)$ being between $-0.4$ and $-0.8$, the blanks showing visible surface cracks after said upsetting being discarded, and the blanks free from visible cracks being subjected to said third to fifth steps.

4. A method as set forth in claim 2, wherein said steel bar or rod has a carbon content of 0.16% to 0.25%.

5. A method as set forth in claim 2, wherein said blanks are annealed between said first step and one of said second to fourth steps by heating the same from a temperature of 300° C. to an annealing temperature above the austenite transition temperature $A_3$ of the steel in said bar or rod and below 1250° C. within 1 to 5 minutes, holding said blanks at said annealing temperature for 1 to 5 minutes, and cooling the blanks from said annealing temperature to 500° C. at a rate of about 50 to 100° C. per minute.

6. A method as set forth in claim 5, wherein said annealing temperature is at least 50° C. above said austenite transformation temperature $A_3$.

References Cited

UNITED STATES PATENTS

| | | | |
|---|---|---|---|
| 2,371,716 | 3/1945 | Snell | 29—1.3 |
| 2,402,068 | 6/1946 | Meador | 148—12 |

OTHER REFERENCES

American Machinist, July 22, 1943, p. 115.

FRANK T. YOST, Primary Examiner

U.S. Cl. X.R.

29—1.31; 148—12